United States Patent [19]

Kichline et al.

[11] 3,957,679
[45] May 18, 1976

[54] NOVEL SODIUM ALUMINUM PHOSPHATE CHEESE EMULSIFIERS

[75] Inventors: Thomas P. Kichline, Chesterfield; Allen H. Kranz, Florissant, both of Mo.

[73] Assignee: Monsanto Company, St. Louis, Mo.

[22] Filed: Nov. 1, 1973

[21] Appl. No.: 411,609

[52] U.S. Cl............................... 252/351; 423/306; 426/582; 426/654
[51] Int. Cl.²................... B01F 17/14; C01B 25/30; A23C 19/00
[58] Field of Search.................... 252/351; 423/306; 426/186, 227, 582, 654

[56] References Cited
UNITED STATES PATENTS

| | | | |
|---|---|---|---|
| 3,097,949 | 7/1963 | Lauck et al. | 426/227 |
| 3,223,479 | 12/1965 | Vanstrom | 423/306 |
| 3,223,480 | 12/1965 | Vanstrom | 423/306 |
| 3,244,535 | 4/1966 | Lauck et al. | 426/186 |
| 3,337,347 | 8/1967 | Kichline et al. | 426/186 |
| 3,411,872 | 11/1968 | Post | 423/306 |
| 3,554,921 | 1/1971 | Kichline et al. | 252/351 |
| 3,726,960 | 4/1973 | Bell | 426/227 |
| 3,726,962 | 4/1973 | Vanstrom et al. | 423/306 |
| 3,729,546 | 4/1973 | Bell | 423/306 |

*Primary Examiner*—Benjamin R. Padgett
*Assistant Examiner*—Irwin Gluck
*Attorney, Agent, or Firm*—Howard C. Stanley

[57] ABSTRACT

A sodium aluminum phosphate composition having an empirical formula

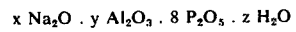

$$x\,Na_2O \cdot y\,Al_2O_3 \cdot 8\,P_2O_5 \cdot z\,H_2O$$

wherein x is a number higher than 15 up to and inclusive of 24, y is a number between 1.0 and 3.9 inclusive, and z is a number between 0 and 50 inclusive, said composition having an optimum available alkalinity for emulsification of cheese. The sodium aluminum phosphate composition is useful as a cheese emulsifier in process cheese compositions.

5 Claims, No Drawings

NOVEL SODIUM ALUMINUM PHOSPHATE CHEESE EMULSIFIERS

BACKGROUND OF THE INVENTION

1. Field of the Invention

This invention relates to compositions which are particularly useful as cheese emulsifiers, processes for preparing cheese with such compositions and cheese formulations containing such compositions. More particularly, this invention relates to sodium aluminum phosphate compositions that provide optimum available alkalinity.

Many phosphate materials are known as cheese emulsifiers for process cheese, such as disodium orthophosphate, trisodium orthophosphate, sodium hexametaphosphate, and the like. However, these materials all have serious limitations as cheese emulsifiers and therefore are not used to the extent desired for cheese emulsification. For example, disodium orthophosphate is generally satisfactory as a cheese emulsifier below about 2.1 percent (based on the total weight of the cheese) but when used in greater amounts, crystals of disodium orthophosphate usually form which is, of course, highly objectionable.

More recently, sodium aluminum phosphate compositions have been suggested as cheese emulsifiers. These sodium aluminum phosphate compositions have been combined with other phosphates such as disodium orthophosphate to form useful compositions for emulsifying cheese when used in levels up to about 3 percent. Illustrative of such compositions are U.S. Pat. Nos. 3,097,949, 3,244,535, 3,337,347, 3,554,921 and more recently U.S. Pat. Nos. 3,726,960 and 3,729,546.

2. Description of the Prior Art

Unfortunately, these known sodium aluminum phosphate compositions do not provide the optimum level of available alkalinity that a cheese manufacturer might desire in his cheese manufacturing operations. Furthermore, it has been found to be extremely difficult to obtain sodium aluminum phosphates that have reproducible available alkalinities in the heretofore known ratios of materials used to form these known sodium aluminum phosphate compositions.

The term "available alkalinity" as used herein means the alkalinity available from sodium aluminum phosphate compositions as determined by test procedures that simulate actual cheese emulsification conditions.

In actual cheese emulsification about 3 percent of the emulsifier is added to the cheese (giving about 7 percent by weight emulsifier concentration in the water phase) at 72±2°C. at an average pH of about 5.8. The The is mixed for about five minutes at this temperature. Loaf cheese is then removed and slowly cooled while undergoing further processing.

The test procedures utilized to determine "available alkalinity" herein are as follows: In as rapid a sequence as possible, 4.9 grams of sample material and about 20 ml. of water (at 80°–90°C.) are placed in a 150 ml. tared beaker which is equipped with a magnetic stirring bar. While maintaining the temperature at 70±4°C., about 35 ml. of 0.5 N HCl is added. The pH is maintained at 5.8 for 30 minutes by adding 0.5 N HCl as necessary. The time, slurry temperature, pH and ml. of HCl added are recorded. The concentration should be adjusted by adding water so that the final weight of the resulting mass is 70.0 grams and has a pH of 5.8 at 70±4°C. This provides a concentration of 7 percent by weight of the emulsifier at the final conditions. The "available alkalinity" (expressed as percent) can be obtained from the following equation:

$$\% = \frac{(\text{ml. of HCl})(N \text{ of HCl})(142)(0.218)(100)}{1000 (\text{Sample Wt.})} = (.316)(\text{ml. of HCl})$$

As discussed hereinafter it has been found that the optimum available alkalinity for many cheese manufacturing procedures is at about 15 percent.

It has now been found, in accordance with the present invention, that an entirely new and distinct class of sodium aluminum phosphate compositions having this desirable optimum available alkalinity, a property heretofore unrecognized, can be prepared. Furthermore, a highly unexpected and surprising characteristic of many of the sodium aluminum phosphate compositions of this invention is that they can be readily reproduced so that subsequently manufactured compositions vary only slightly from previous compositions in their available alkalinity. The new sodium aluminum phosphate compositions have, for use as cheese emulsifiers, the recognized advantages as previously described and, in addition provide both optimum available alkalinity and in most cases the reproducibility necessary to maintain consistent available alkalinities in subsequently manufactured compositions resulting in imparting useful and beneficial properties to cheese, all of which will be more fully discussed hereinafter.

SUMMARY OF THE INVENTION

The sodium aluminum phosphate compositions of the present invention can be characterized by the following empirical formula $$x \text{ Na}_2\text{O} \cdot y \text{ Al}_2\text{O}_3 \cdot 8 \text{ P}_2\text{O}_5 \cdot z \text{ H}_2\text{O}$$

wherein $x$ is a number higher than 15 up to and inclusive of 24, $y$ is a number between 1.0 and 3.9 inclusive, and $z$ is a number between 0 and 50 inclusive. Particularly preferred compositions are when $x$ is a number higher than 15 up to and inclusive of 18.

In addition, the preferred compositions are substantially amorphous, i.e., an X-ray pattern exhibits no characteristic lines of sodium aluminum phosphates and if some lines are present, they are usually those characteristic for small amounts of disodium orthophosphate, and/or trisodium orthophosphate. It should be noted, however, that these compositions can be formed in the crystalline state and although the crystalline forms are useful as cheese emulsifiers they do not appear, in general, to exhibit the advantageous properties as cheese emulsifiers that the amorphous forms of the compositions exhibit. In addition, the water as indicated in the foregoing formula should not necessarily be taken as representing water of crystallization since thermal gravimetric analysis indicated that the water is lost gradually when the compositions are heated to temperatures between about 80°C. and about 500°C. and there is usually no clearly defined break such as would be present in the case of free water or a crystalline hydrate.

DESCRIPTION OF THE PREFERRED EMBODIMENTS

Compositions of the present invention can be prepared in many different ways, however a preferred method for producing the compositions, in general, comprises reacting a sodium material, an aluminum containing material, and a phosphorus containing material. In particular, the sodium materials which are suitable include the sodium oxides, sodium hydroxides, and the sodium orthophosphates, such as the monosodium, disodium, and the trisodiumorthophosphates, including mixtures thereof. In addition, the aluminum containing materials, which are suitable include aluminum oxide, aluminum hydroxide, and the sodium aluminates including mixtures thereof. Further, the phosphorus containing materials include the sodium orthophosphates and orthophosphoric acid including mixtures thereof. When orthophosphoric acid is used, it is preferably concentrated, i.e., containing above about 50 percent $H_3PO_4$ by weight. In general, the reactants are admixed in any order and, if necessary, water is added in sufficient amounts to provide a suitable reaction medium with the reaction preferably conducted under agitation. The reaction is usually exothermic and the temperature, depending upon the amount of water used, if any, reactants used and the like, can reach as high as about 70°C. to about 140°C., although it is generally preferred to keep the temperature below about 100°C. Again, depending upon the reactants and the reacting conditions used, an amount of water can be added which will give, because the reaction is exothermic, a relatively dry, pulverulent reaction product.

In cases where excess water is used, the reaction products can usually be dried to a dry, particulate state by various means in order to remove the water, such as by drum drying. While it is preferred that sufficient water be present to give a slurry concentration of no more than about 90 percent solids by weight, it is rarely necessary, if ever, to use a slurry concentration of less than about 20 percent solids by weight. The amounts of sodium materials, aluminum containing materials, and the phosphorus containing materials are selected in such a manner as will give the desired amounts of sodium, aluminum, and phosphorus in the reaction product. The preferred procedure for preparing the sodium aluminum phosphate compositions of the present invention is to react phosphoric acid with hydrated alumina and subsequently react the resulting mass with sodium hydroxide or sodium carbonate.

As previously mentioned, the sodium aluminum phosphate compositions of the present invention provide an available alkalinity which is particularly desired by commercial cheese manufacturers. Illustrative of the significance of such available alkalinity is Table I below wherein various commercial cheese emulsifiers, their concentrations upon use in cheese and the available alkalinities are shown for commercial cheese manufacturing operations. This table shows that available alkalinity of about 15.5±1 percent is the level desired by many such manufacturing operations, preferably 15.5±0.5 percent.

Table I

| Emulsifier | Concentration (% wt.) | Available Alkalinity (%) |
|---|---|---|
| Kasal-9[1] + | 2.5 | 10.0 |
| Trisodium phosphate | + 0.5 | + 6.1 |
| Mixture actually used | 3.0 | 16.1 |
| Emulsiphos 660[2] | 3.0 | 14.9 |
| Emulsiphos 440[3] | 3.0 | 15.1 |
| Disodium Phosphate | 2.1 | 15.2 |
| Trisodium Phosphate | 1.2 | 14.8 |

[1]A commercial cheese emulsifier of the Stauffer Chemical Company which contains a sodium aluminum phosphate of empirical formula
14.69 $Na_2O$ . 2.43 . $Al_2O_3$ . 8 $P_2O_5$ . 11.5 $H_2O$
[2]A commercial cheese emulsifier of Monsanto Company which contains trisodium phosphate and sodium metaphosphate.
[3]A commercial cheese emulsifier of Monsanto Company which contains disodium phosphate and sodium metaphosphate.

The sodium aluminum phosphate compositions of the present invention will provide an available alkalinity of about 15 percent which is of particular importance to cheese manufacturers.

Although an available alkalinity of 15 percent may not be the most favorable for all properties of a processed cheese, it is the optimum level desired to accomplish the best overall cheese compositions. Cheese properties that are most affected by alkalinity are oil off, break and crystal formation. Table II illustrates the effect of different levels of available alkalinities on these properties. (The numbers shown are on arbitrary scales of good to poor).

Table II

| Emulsifier | Alkalinity | Oil Off | Cheese Properties Break | Crystal Formation |
|---|---|---|---|---|
| Trisodium Phosphate | 25% | 3.2(good) | 0.8 | 2.0(poor) |
| Trisodium Phosphate | 15% | 3.2 | 1.1 | 1.5 |
| Disodium Phosphate | 14% | 3.0 | 1.5(good) | 0.2 |
| Monosodium Phosphate | 0 | 1.6(poor) | 0(poor) | 0(good) |

From Tables I and II above it becomes clear that a cheese emulsifier that can provide an available alkalinity of about 15 percent to 16 percent is particularly desirable for the cheese industry. The novel sodium aluminum phosphate compositions of the present invention provide the heretofore described advantageous properties of such materials and, additionally, provide this feature of 15 percent or higher available alkalinity.

Furthermore, it has been found that many of these sodium aluminum phosphate compositions formed at the ratios of materials necessary for those of the present invention are surprisingly more reproducible. By this it is meant that, contrary to the widely varying alkalinities obtained with commercial grade materials, many of the sodium aluminum phosphate compositions of the present invention have reproducible available alkalinities. To illustrate, the following procedures 1–5 are preparative methods for a sodium aluminum phosphate composition designated as T. (Similar procedures as indicated are utilized for preparing the other exemplary sodium aluminum phosphate compositions shown in Table IV).

PROCEDURE 1

A total of 212.1 gms. of $Al_2O_3.3H_2O$ is dissolved in 1006.4 gms. of 50 percent NaOH. This mixture is diluted with 785 gms. of water. A dilute acid solution is made by adding 811.1 gms. of 80 percent $H_3PO_4$ to 785 gms. of water and then added with agitation to the alumina-caustic solution. The resulting 30 percent slurry is then homogenized and spray dried.

PROCEDURE 2

The same as Procedure 1 except the slurry is drum dried.

PROCEDURE 3

A total of 212.1 gms. of $Al_2O_3.3H_2O$ is dissolved in 1006.4 gms. of 50 percent NaOH. This mixture and 811.1 gms. of 80 percent $H_3PO_4$ are simultaneously added to 1570 gms. of $H_2O$ with agitation. The resulting slurry is then homogenized and spray dried.

PROCEDURE 4

The same as Procedure 3 except the slurry is drum dried.

PROCEDURE 5

A total of 212.1 gms. of $Al_2O_3.3H_2O$ is dissolved in 811.1 gms. of 80 percent $H_3PO_4$ and then diluted with 785 gms. of water. This mixture was then added with agitation to a solution of 785 gms. of water and 1006.4 gms. of 50 percent NaOH. The slurry is homogenized and spray dried.

Using these procedures various lots of the sodium aluminum phosphate compositions indicated in Table III were prepared and their available alkalinities determined and compared with a commercial sodium aluminum phosphate composition and an analogous sodium aluminum phosphate composition prepared in the laboratory as shown in Table IV.

Table III

| Sodium Aluminum Phosphate Composition | Analysis on an Anhydrous Molar Basis | | |
|---|---|---|---|
| | $Na_2O$ (%) | $Al_2O_3$ (%) | $P_2O_5$ (%) |
| D | 42.0 | 7.5 | 50.5 |
| T | 39.0 | 14.0 | 47.0 |
| M | 40.0 | 11.5 | 48.5 |
| J | 39.5 | 15.0 | 45.5 |
| K* | 39.5 | 11.0 | 49.5 |
| K-9** | 39.5–40.2 | 10.5–11.1 | 49.4–49.7 |

*Laboratory prepared sodium aluminum phosphate composition analogous to K-9.

**Commercially available sodium aluminum phosphate composition of The Stauffer Chemical Company (analysis of five samples).

Table IV

| SALP | Lot | Procedure | Available Alkalinity |
|---|---|---|---|
| D | 1 | 3 | 15.3 |
| D | 2 | 3 | 15.3 |
| D | 3 | 3 | 15.1 |
| D | 4 | 3 | 14.9 |
| D | 5 | 3 | 15.8 |
| T | 1 | 2 | 15.2 |
| T | 2 | 3 | 15.6 |
| T | 3 | 2 | 15.6 |
| T | 4 | 2 | 15.6 |
| T | 5 | 2 | 15.2 |
| T | 6 | 3 | 15.4 |
| T | 7 | 1 | 15.5 |
| T | 8 | 5 | 15.6 |
| T | 9 | 1 | 15.6 |
| T | 10 | 3 | 15.8 |

Table IV-continued

| SALP | Lot | Procedure | Available Alkalinity |
|---|---|---|---|
| T | 11 | 1 | 15.2 |
| M | 1 | 3 | 15.1 |
| M | 2 | 3 | 15.4 |
| M | 3 | 3 | 15.7 |
| M | 4 | 3 | 15.8 |
| M | 5 | 3 | 15.4 |
| M | 6 | 3 | 15.5 |
| J | 1 | 4 | 16.0 |
| J | 2 | 2 | 16.2 |
| J | 3 | 2 | 15.9 |
| J | 4 | 2 | 15.7 |
| K | 1 | 2 | 12.1 |
| K | 2 | 2 | 14.5 |
| K | 3 | 4 | 15.6 |
| K-9 | | | 11.6 |
| K-9 | | | 13.0 |
| K-9 | UNKNOWN | | 13.4 |
| K-9 | | | 14.0 |
| K-9 | | | 11.9 |

As can be readily observed from Table IV, the sodium aluminum phosphate compositions of the present invention have significantly more reproducible available alkalinities than the commercial sodium aluminum phosphate composition and the analogous laboratory prepared sodium aluminum phosphate composition which are outside of the scope of the present invention.

The process cheese formulations of the instant invention, i.e., one or more cheese stocks and emulsifiers, can be prepared by mixing, preferably with the aid of heat, one or more cheese stocks and, as an emulsifier, the sodium aluminum phosphate compositions of the instant invention. Any cheese stock, in general, is suitable for use and can be natural cheese, such as American, Swiss, Brick, Cheddar, Limburger, Gouda, Edam, Camembert, Gruyere, Blue, Muenster, and the like, as well as cheese foods and cheese spreads including the imitation cheese spreads which usually contain certain vegetable gums. Depending upon the particular cheese stocks and/or cheese stock blends employed, the sodium aluminum phosphate compositions can be used in amounts up to about 6 percent by weight and as low as 0.1 percent by weight of the total cheese composition, with amounts between about 1.5 percent to about 3 percent by weight being preferred. In addition, in some instances, the sodium aluminum phosphate compositions of the instant invention can be used in conjunction with other cheese emulsifiers, such as disodium orthophosphate, trisodium orthophosphate, sodium citrates, and the like, including mixtures thereof although this is not a necessity.

In general, the cheese formulations can be prepared by admixing the cheese stocks and/or cheese stock blends with emulsifiers in such a manner as to thoroughly blend the additives. Usually heat is necessary in order to be able to sufficiently work the cheese stocks and, in general, temperatures between about 120°F. to 200°F. are suitable. In some cases it is advantageous to incorporate the cheese emulsifier of the present invention in the cheese stock and/or cheese stock blends while the cheese is being prepared in its curd form before drying, although, in general, it is preferred to blend the emulsifier with the cheese stock and/or cheese stock blends after the cheese has been prepared and cured to a suitable degree.

The sodium aluminum phosphate compositions impart to the cheese stocks not only emulsifying properties, i.e., preventing or minimizing oil separation from the cheese stocks especially when heated, but also such advantageous properties as exhibiting no tendency to crystallize, improving the development of melt, i.e., the ability of the cheese to melt without oil separation, so that little or no curing period is required, and exhibiting the ability to raise the pH of a cheese to the desired level for process cheese formulations which is usually between about 5.5 to about 6. Equally as important, the cheese emulsifiers of the present invention exhibit, as cheese emulsifiers, other advantageous properties which are not believed to be found in conventional cheese emulsifiers, such as their ability to be used in a wide variety of cheese stocks having various ages and pH's as well as various cheese stock blends which enables the cheese manufacturer to formulate and prepare process cheese formulations without any unnecessary processing and/or blending of the cheese stocks. In addition, the cheese emulsifiers of the present invention impart to pre-cut sliced process cheese formulations the distinct and important advantage of permitting better and easier separation of the slices which is often, in the case of such cheese, the deciding factor in the consumers preference. In addition, the substantially amorphous sodium aluminum phosphate compositions are, in general, excellent cheese emulsifiers, especially from the standpoint of the highly objectionable feature of crystal formation, since these compositions are substantially amorphous and do not exhibit the tendency to form crystals even under stringent conditions of use. As can be appreciated, therefore, the process cheese formulation having incorporated therein the cheese emulsifiers of the present invention are superior cheese formulations for many and various reasons.

CHEESE TESTS

In the following tests, compositions of the present invention are used as cheese emulsifiers in processing cheese. In general, the process cheese formulations are prepared by adding ground cheddar cheese stock, about 386 grams, and the cheese emulsifiers, in amounts as indicated in the following Tables, to a mixing bowl used with a Hobart C-100 mixer. The mixing bowl is equipped with a steam injection system for uniform heating of the cheese formulation. The cheese and the emulsifier are mixed under steam injection for about 2.25 minutes and an additional period of time of about 5 seconds with no steam injection. The rate of steam injection is adjusted so that the final cheese temperature is about 75°–80°C. Hot cheese melts are poured into Teflon-lined trays, covered with Teflon sheets, rolled out to a thickness of ⅛ inch and cooled to refrigerator temperatures. The cooled melt was cut in standard 4 inch square slices, stacked, packed and stored in the refrigerator at 5°–8°C. The resulting cheese formulations were evaluated for the following properties: pH, melting spread, oil-off, penetration, grain and slice separation. Evaluation methods for determining these properties are as follows:

pH pH measurements were made on cheese slurries with a Fisher Accumet Model 520 Digital pH meter. Slurries were 20 gms. of cheese blended into 10 gms. of distilled water at room temperature.

MELTING SPREAD

Discs of cheese, 22 mm. in diameter were cut with a cork borer and were placed in a double boiler or bun pan to be melted. An average value from the following two tests were recorded.

1. Cheese discs were placed on a cold aluminum bun pan 15½ inches × 10¼ inches × ¾ inches in size. The pan of cheese discs was heated 5 minutes at 350°F. in a baking oven. Then the pan was removed from the oven to the bench top to cool. Duplicate or triplicate discs from up to 7 cheese samples were tested at the same time. The pan was covered with plastic during preparation of the discs to keep the cheese from drying. The spread of the cheese curd, not oil, was measured in mm. The melt spread value for each disc was the average of three measurements of diameter made at equal intervals of rotation.

2. Cheese discs, 2 slices thick, were placed in a cold top pan of a 2 quart double boiler (Commet brand). The pan of cheese discs was heated over boiling water for 4 minutes. Then the pan was removed from the heat to the bench top to cool. The lid was kept on the pan throughout the tests to keep the cheese from drying. Duplicate tests were made at the same time using a second double boiler of the same type.

The melt spread was measured the same as in the oven method.

OIL-OFF

The degree of oil separation upon heating the cheese discs was observed and reported on the basis of numerical scale. A value of 3.0 indicates no oil separation while 0 represents considerable oil-off.

PENETRATION

A precision penetrometer equipped with a needle probe was used to measure the penetration of a stack of cheese slices. The probe point was placed at the cheese surface and then released for 5 seconds by stop watch. Penetration was the depth in 0.1 mm. that the probe sank into the cheese. To keep temperatures uniform each cheese was taken from the refrigerator just before testing.

SLICE SEPARATION

Ease of separating the slices was rated on a 0-3 scale. A value of 3.0 indicates very easy separation while 0 means the slices could not be separated without tearing into pieces.

Tables V through VII show the characteristics of cheese formulations prepared with the sodium phosphate compositions of this invention as emulsifiers at the indicated concentrations in comparison with other cheese emulsifiers. Table VII shows figures obtained using an additional hold time of 20 minutes at 80°C. to simulate slow cooling of large batches of emulsified cheese prepared commercially.

TABLE V

| Emulsifier System | | | Cheese Properties | | | |
|---|---|---|---|---|---|---|
| Emulsifier | Anhyd.% Used | pH | Melt Spread | Oil Off | Penetr. Value | Slice Separation |
| Kasal – 9[1] + trisodium phosphate | 3.0[3] | 6.42 | 35.3 | 2.7 | 74 | 3.0 |
| Kasal – 9[2] + trisodium phosphate | 3.0[4] | 6.20 | 36.7 | 2.6 | 72 | 3.0 |
| M[5] | 3.0 | 6.33 | 36.2 | 2.4 | 67 | 3.0 |
| D[6] | 3.0 | 6.28 | 35.0 | 2.6 | 66 | 3.0 |
| Disodium phosphate | 2.1 | 6.03 | 34.7 | 2.5 | 76 | 3.0 |
| T[7] | 3.0 | 6.37 | 36.3 | 2.4 | 68 | 3.0 |
| Trisodium phosphate | 1.2 | 6.30 | 39.7 | 0.8 | 73 | 3.0 |

[1]14% Available Alkalinity.
[2]11.6% Available Alkalinity.
[3,4]The total of 2.5% by weight of Kasal–9 and 0.5% by weight of trisodium phosphate.
[5,6,7]Sodium Aluminum Phosphate Compositions of Tables III and IV.

TABLE VI

| Emulsifier System | | | Cheese Properties | | | |
|---|---|---|---|---|---|---|
| Emulsifier | Anhyd.% Used | pH | Melt Spread | Oil Off | Penetr. Value | Slice Separation |
| Kasal – 9[1] + trisodium phosphate | 2.70[3] | 6.20 | 36.3 | 2.3 | 74 | 3.0 |
| Kasal – 9[2] + trisodium phosphate | 2.70[4] | 6.10 | 37.7 | 2.2 | 72 | 3.0 |
| M[5] | 2.70 | 6.09 | 36.3 | 2.5 | 67 | 2.8 |
| DSP/TSP[6] | 1.36 | 6.01 | 40.1 | 1.8 | 72 | 3.0 |
| D[7] | 2.70 | 6.03 | 35.1 | 2.6 | 63 | 3.0 |
| Disodium phosphate | 1.80 | 5.83 | 37.8 | 2.5 | 71 | 2.5 |
| T[8] | 2.70 | 6.16 | 37.7 | 2.4 | 69 | 2.8 |
| Trisodium phosphate | 1.08 | 6.10 | 42.2 | 0 | 69 | 1.8 |

[1]14% Available Alkalinity.
[2]11.6% Available Alkalinity.
[3,4]The total of 2.5% by weight of Kasal-9 and 0.5% by weight of trisodium phosphate.
[6]Mixture of disodium phosphate (56%) and trisodium phosphate (44%).
[6,7,8]Sodium Aluminum Phosphate Compositions of Tables III and IV.

TABLE VII (20 minute hold time at 80°C.)

| Emulsifier System | | | Cheese Properties | | | |
|---|---|---|---|---|---|---|
| Emulsifier | Anhyd.% Used | pH | Melt Spread | Oil Off | Penetr. Value | Slice Separation |
| Kasal – 9[1] + trisodium phosphate | 3.00[3] | 6.28 | 39.9 | 1.8 | 80 | 1.5 |
| Kasal – 9[2] + trisodium phosphate | 3.00[4] | 6.16 | 38.9 | 1.1 | 69 | 1.5 |
| M[5] | 3.00 | 6.18 | 37.4 | 2.2 | 69 | 3.0 |
| DSP/TSP[6] | 1.50 | 6.02 | 41.1 | 0.3 | 74 | 2.0 |
| D[7] | 3.00 | 6.11 | 31.8 | 2.1 | 80 | 1.0 |
| Disodium phosphate | 2.10 | 5.87 | 30.4 | 1.0 | 84 | 1.0 |
| T[8] | 3.00 | 6.23 | 41.3 | 0.4 | 72 | 3.0 |
| Trisodium phosphate | 1.20 | 6.11 | 40.0 | 0 | 71 | * |

*Could not get out of casting tray
[1]14% Available Alkalinity.
[2]11.6% Available Alkalinity.
[3,4]The total of 2.5% by weight of Kasal–9 and 0.5% by weight of trisodium phosphate.
[6]Mixture of disodium phosphate (44%) and trisodium phosphate (56%).
[5,7,8]Sodium Aluminum Phosphate Compositions of Tables III and IV.

While the invention has been described herein with regard to certain specific embodiments, it is not so limited. It is to be understood that variations and modifications thereof may be made by those skilled in the art without departing from the spirit and scope of the invention.

The embodiments of this invention in which an exclusive property or privilege is claimed are defined as follows:

1. A sodium aluminum phosphate composition having an empirical formula

$$x\, Na_2O \cdot y\, Al_2O_3 \cdot 8\, P_2O_5 \cdot z\, H_2O$$

wherein $x$ is a number higher than 15 up to and inclusive of 24, $y$ is a number between 1.0 and 3.9 inclusive, and $z$ is a number between 0 and 50 inclusive.

2. A composition according to claim 1 wherein $x$ is a number higher than 15 up to and inclusive of 18.

3. A composition according to claim 1 which is essentially amorphous.

4. A composition according to claim 2 which is essentially amorphous.

5. A composition according to claim 1 which has an available alkalinity of about 15 percent.

* * * * *